(12) United States Patent
Lamp (10) Patent No.: US 8,395,509 B2
(45) Date of Patent: *Mar. 12, 2013

(54) RFID TAG ASSEMBLY AND METHOD OF MANAGING A RACE

(75) Inventor: Shauna L. Lamp, Alliance, OH (US)

(73) Assignee: Miller Products, Inc., Sebring, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/449,035

(22) Filed: Apr. 17, 2012

(65) Prior Publication Data

US 2012/0199283 A1   Aug. 9, 2012

Related U.S. Application Data

(63) Continuation of application No. 13/078,158, filed on Apr. 1, 2011, now Pat. No. 8,174,393, which is a continuation of application No. 12/136,805, filed on Jun. 11, 2008, now Pat. No. 7,948,383.

(51) Int. Cl.
   *G08B 13/14* (2006.01)

(52) U.S. Cl. ............... 340/572.8; 340/10.52; 40/633

(58) Field of Classification Search ............... 340/572.8, 340/572.1, 10.52; 40/633; 283/75
See application file for complete search history.

(56) References Cited

U.S. PATENT DOCUMENTS

| | | | |
|---|---|---|---|
| 7,948,383 B2 * | 5/2011 | Lamp | 340/572.8 |
| 8,174,393 B2 * | 5/2012 | Lamp | 340/572.8 |
| 2008/0309065 A1 | 12/2008 | Ali et al. | |
| 2008/0316032 A1 | 12/2008 | Kia | |
| 2009/0094872 A1 | 4/2009 | Ali et al. | |
| 2009/0141138 A1 | 6/2009 | DeAngelis | |
| 2009/0184806 A1 | 7/2009 | Kia | |

* cited by examiner

*Primary Examiner* — John A Tweel, Jr.
(74) *Attorney, Agent, or Firm* — Sand & Sebolt (57) ABSTRACT

A race management system which includes an RFID tag located between an inner and outer layer and is removably secured to a participant's bib through a mounting film. The inner layer is secured to a second inner layer having at least one fold line and an adhesive portion outward of the at least one fold line. The RFID tag is secured around a portion of the participant's shoe and is activated by at least one antenna to transmit identification data encoded on the tag. The encoded data corresponds to indicia printed on the bib and allows automatic collection of running times.

16 Claims, 6 Drawing Sheets

RFID TAG ASSEMBLY AND METHOD OF MANAGING A RACE

CROSS-REFERENCE TO RELATED APPLICATIONS

This application is a Continuation of U.S. patent application Ser. No. 13/078,158 filed Apr. 1, 2011, which is a Continuation of U.S. patent application Ser. No. 12/136,805 filed Jun. 11, 2008, now U.S. Pat. No. 7,948,383; the entire specifications of which are incorporated herein by reference.

BACKGROUND OF THE INVENTION

1. Technical Field

The invention relates generally to a customizable RFID tag, race management system, and a method of managing a race. More particularly, the invention relates to an RFID tag that is attached to a bib and removable to secure the RFID tag to a race participant as well as coordinate user specific race, identification, and health information. Specifically, the invention relates to an embedded RFID tag which is secured to a bib and removed by the participant to secure around his/her shoelaces in order to provide participant start/stop times, medications, allergies, and other relevant medical information as well as relate the participant's race number to the participant's RFID tag.

2. Background Information

Race organizers have traditionally struggled to coordinate runners with their assigned running numbers due to the potentially large number of competitors. When competitors register for the race, they are generally assigned a bib with a number that can be affixed to their shirt. The number is associated with the runner's name, address, and medical information which may be maintained in a database. In well known races such as the Boston Marathon, more than 20,000 runners participate and the organizers are forced to write down the finishing time of each runner as he or she crosses the finish line. Thus, the industry is constantly in search of improvements that can reduce the number of organizers required to monitor the finish line and increase the efficiency of the finish line timing.

Once a race begins, there is generally only one official timer, meaning the runners who are 20,000 people behind the starting line are at a severe disadvantage since they must wait for all of the runners in front of them to begin running and cross the start line before they can begin the race. The runners not only have to travel a further distance, but also suffer from additional time being included in their race time. Thus, the industry is constantly in search of improvements that can provide more accurate race results for each individual runner so that each runner is able to accurately gauge his or her actual performance. Further, runners have not been able to measure and compare their individual performances at various stages throughout the race.

Marathons are endurance races that require a great deal of stamina and strength to finish. Unfortunately, not all runners are mentally and physically fit enough to finish the marathon. The runners may become dehydrated and eventually pass-out or injure themselves. In order to treat the injured or dehydrated runner, the organizers have to verify any medical information listed on his or her bib. Therefore organizers lose valuable seconds ensuring that they are fully aware of any medical issues the runner may have or will not be able to verify the runner's medical history if the bib were to fall off or become unreadable.

Finally, runners tend to perspire a great deal during a marathon and may cause any information located on the bib to bleed and become unreadable. Since, as mentioned above, it is very important that organizers have access to the medical and personal information on the bib; runners have been required to use certain writing instruments or special bibs that prevent the information from being washed away. Thus there is a demonstrated need for a race management system which is capable of accurately timing each individual runner at various stages of the race, can provide information about the runner as necessary, and capable of operating in a damp environment.

SUMMARY OF THE INVENTION

The race management system of the present invention comprises a bib arranged to receive printed indicia, a programmable tag secured between an outer layer and an inner layer, a mounting film fixedly secured to the bib, and the inner layer is releasably secured to the mounting film. The outer and inner layers further comprise a first end and at least one fold line. The inner layer includes an adhesive layer between the first end and the at least one fold line. The inner and outer layers further include at least one second fold line defining an outer portion and the adhesive portion is fixedly secured to the outer portion in a generally round nature. The race management system further includes printed indicia on the bib corresponding to data encoded in the programmable tag. An antenna may be disposed on the course which activates the programmable tag and the programmable tag transmits the encoded data to the antenna. Further, the bib and programmable tag are separable.

The method of managing a race of the present invention comprises locating a programmable tag between an outer layer and an inner layer, securing the inner layer to a second inner layer having an adhesive portion on a first end, releasably securing the second inner layer to a mounting film, fixedly securing the mounting film to a bib, and disposing at least one antenna on a race route. The method further includes printing indicia on the bib and encoding the programmable tag with data corresponding to the printed indicia. The method also includes removing the encoded programmable tag from the bib and locating the programmable tag underneath at least one securing object. The method further includes securing the adhesive portion to a second end of the second inner layer, rotating the adhesive portion of the programmable tag below the at least one securing object, and transmitting the data to the at least one antenna.

BRIEF DESCRIPTION OF THE DRAWINGS

The preferred embodiments of the invention, illustrative of the best modes in which Applicant has contemplated applying the principles of the invention, are set forth in the following description and are shown in the drawings.

DESCRIPTION OF THE PREFERRED EMBODIMENTS

At the outset, it should be appreciated that like drawing numbers on different drawing views identify identical, or functionally similar, structural elements of the invention. While the present invention is described with respect to what is presently considered to be the preferred embodiments, it is to be understood that the invention as claimed is not limited to the disclosed aspects.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
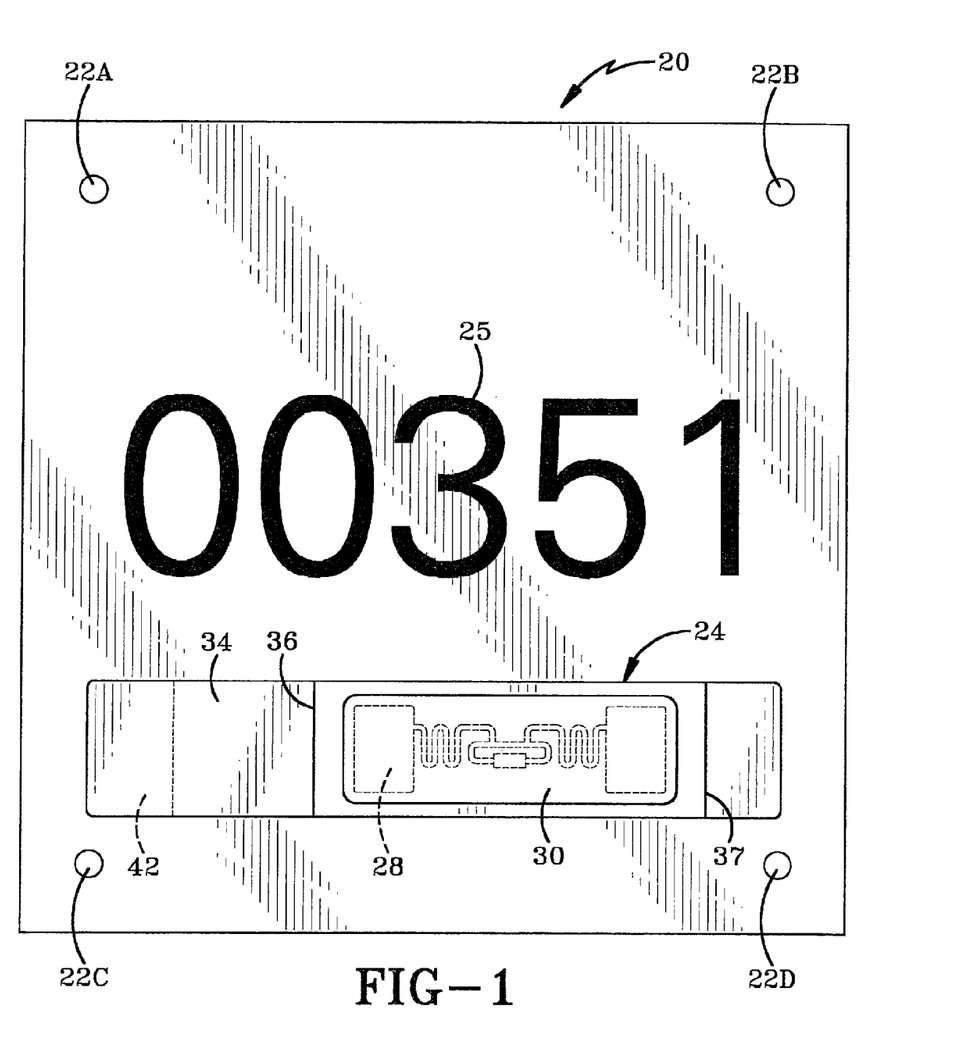
FIG. 1 is a front view of a front face of a preferred embodiment bib with a printed participant's number and an RFID tag removably secured.
Figures 2, 3:
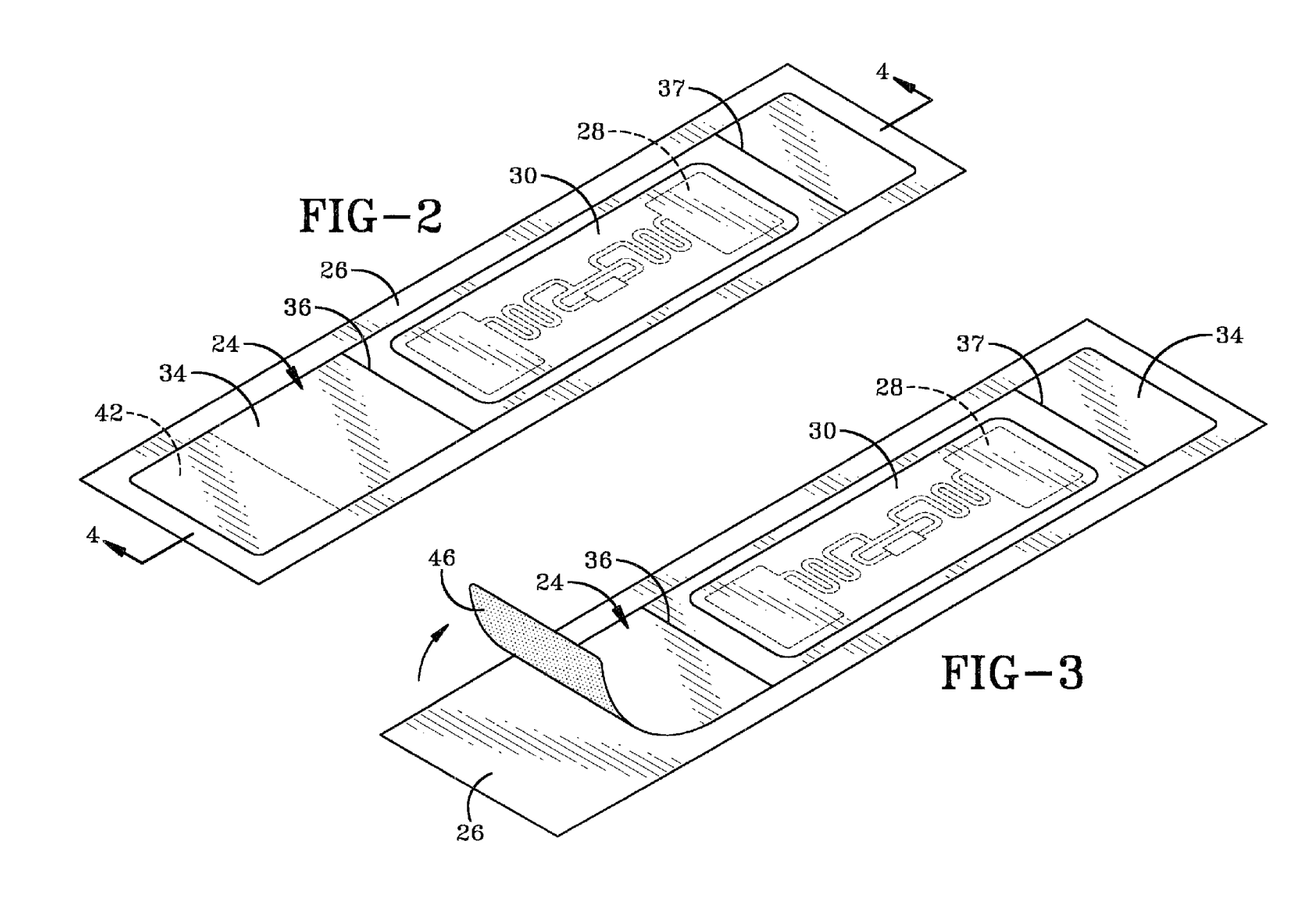
FIG. 2 is a perspective view of a preferred embodiment RFID tag removably secured to a mounting film.
FIG. 3 is a perspective view of a preferred embodiment RFID tag being removed from the mounting film.

The race management system of the present invention is indicated generally at bib 20, as is particularly shows in FIGS. 1, 2, and 3. Bib 20 is arranged to attach to a runner or participant through holes 22A, 22B, 22C, and 22D or with releasable adhesive (not shown). Bib 20 is a thin sheet and can be composed of paper, plastic, or other suitable material which is capable of being printed on. RFID tag assembly 24 is shown affixed to the front face of bib 20, but could also be affixed to the back face or any other side. The bib is further shown with indicia 25 printed on the front face.

In accordance with one of the main features of the present invention, the following should be viewed in light of FIGS. 2, 3, 4 and 5 which illustrate various views of a preferred embodiment RFID tag assembly 24. If RFID tag assembly 24 is shipped separately from bib 20, then RFID tag assembly 24 is originally removably secured to a top side of a mounting film 26 with a dry release, evaporative, or similar adhesive (described infra) until the manufacturer or participant peels the assembly upwards. Alternatively, RFID tag assembly 24 may be shipped directly attached to bib 20. In this situation, an adhesive layer must secure the RFID tag assembly to the bib, but leave a clean residual and adhesive-free surface when the assembly is removed. In this situation, the RFID tag assembly 24 tag must be removable from bib 20 while leaving a permanent adhesive layer and covering on bib 20 even once the RFID tag assembly 24 is removed.

Figure 4:
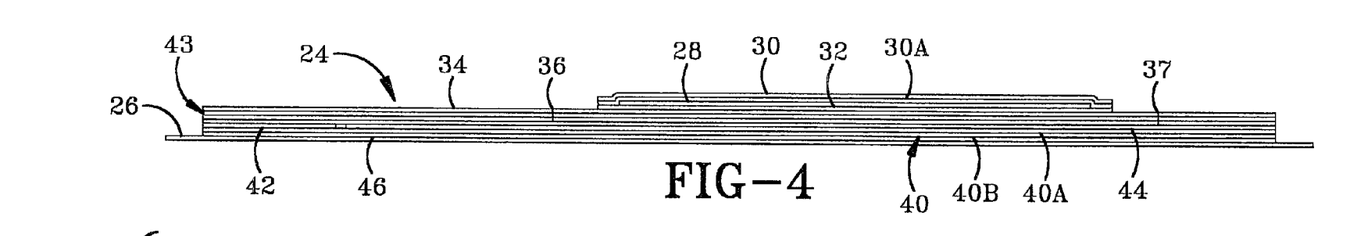
FIG. 4 is a sectional view of the preferred embodiment RFID tag taken generally along line 4-4 of FIG. 2.
Figure 5:
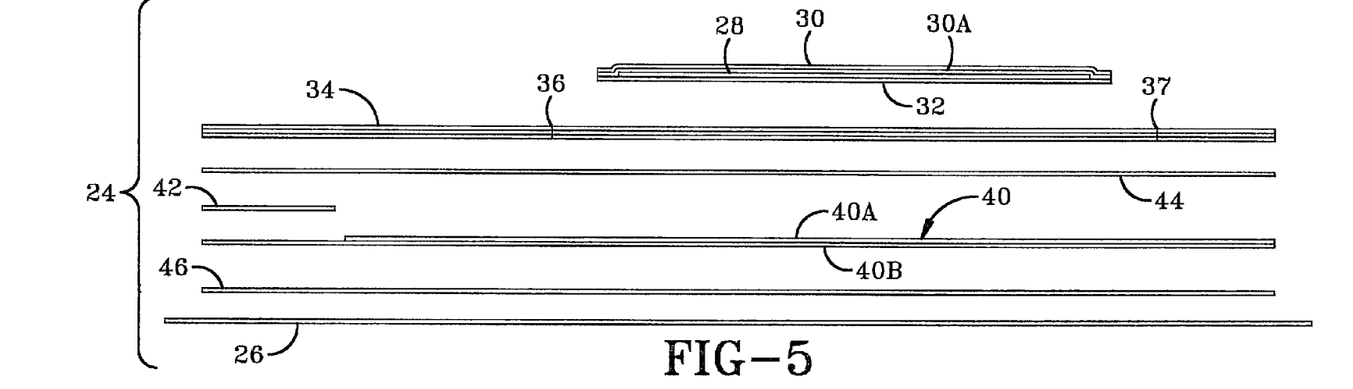
FIG. 5 is an exploded view of the RFID tag of FIG. 4.

Averting now to FIGS. 4 and 5, RFID tag assembly 24 preferably includes RFID tag 28 positioned between outer layer 30 and inner layer 32. RFID tag 28 is a typical passive radio-frequency identification device with an integrated circuit which can be encoded with data. The RFID tag does not have an internal power supply and is powered by a radio frequency emitted from an antenna (described infra). The RFID tag may then backscatter the emitted frequency to the antenna which provides the identification and encoded data of the RFID tag. While the RFID tag of the present invention has been described as a passive tag, it is within the spirit and scope of the present invention as claimed to incorporate an active, semi-active, or other powered RFID tag. Further, while the present invention is described incorporating an RFID tag, any programmable tag or chip may be used and is within the spirit and scope of the invention as claimed.

Outer layer 30 and inner layer 32 are preferably composed of polypropylene or other similarly suitable water-proof material which is approximately 2.6 mils, or approximately 2.6 thousandths of an inch thick. While a thickness of 2.6 mils is preferred for the inner and outer layers, the present invention is not limited to any particular thickness for each individual component or the RFID tag assembly collectively. Adhesive layer 30A assures that layers 30 and 32 are adhered to each other and to RFID tag 28.

In accordance with another of the main features of the invention, Inner layer 32 is fixedly secured to the top side of synthetic material 34 which is generally firm and provides support while maintaining flexibility. The synthetic material is stamped with fold lines 36 and 37 across the width, or shorter side, of RFID tag assembly 24. Fold lines 36 and 37 are located approximately one-half of an inch outward of RFID tag 28. The bottom side of synthetic material 34 may include a liner (not shown) which can be removed. In a preferred embodiment, all of the liner is removed except for approximately one-half of an inch at one end. Additional layer of permanent adhesive 44 secures intermediate layer 40 to synthetic material 34 on the area from which the liner was removed. Accordingly, intermediate layer 40 encompasses the majority of the bottom surface of synthetic material 34 and is on virtually the same plane as remaining one-half inch of liner 42 located on first end 43. The dry release, evaporative, or similar adhesive 46, described supra, is merged onto intermediate layer 40 and remaining one-half inch of liner 42 to removably secure the RFID tag to mounting film 26. More particularly, and referring to FIG. 7, intermediate layer 40 includes a top layer 40A and bottom layer 40B which are split apart as RFID tag 28 is removed from bib 20.

Figure 6:
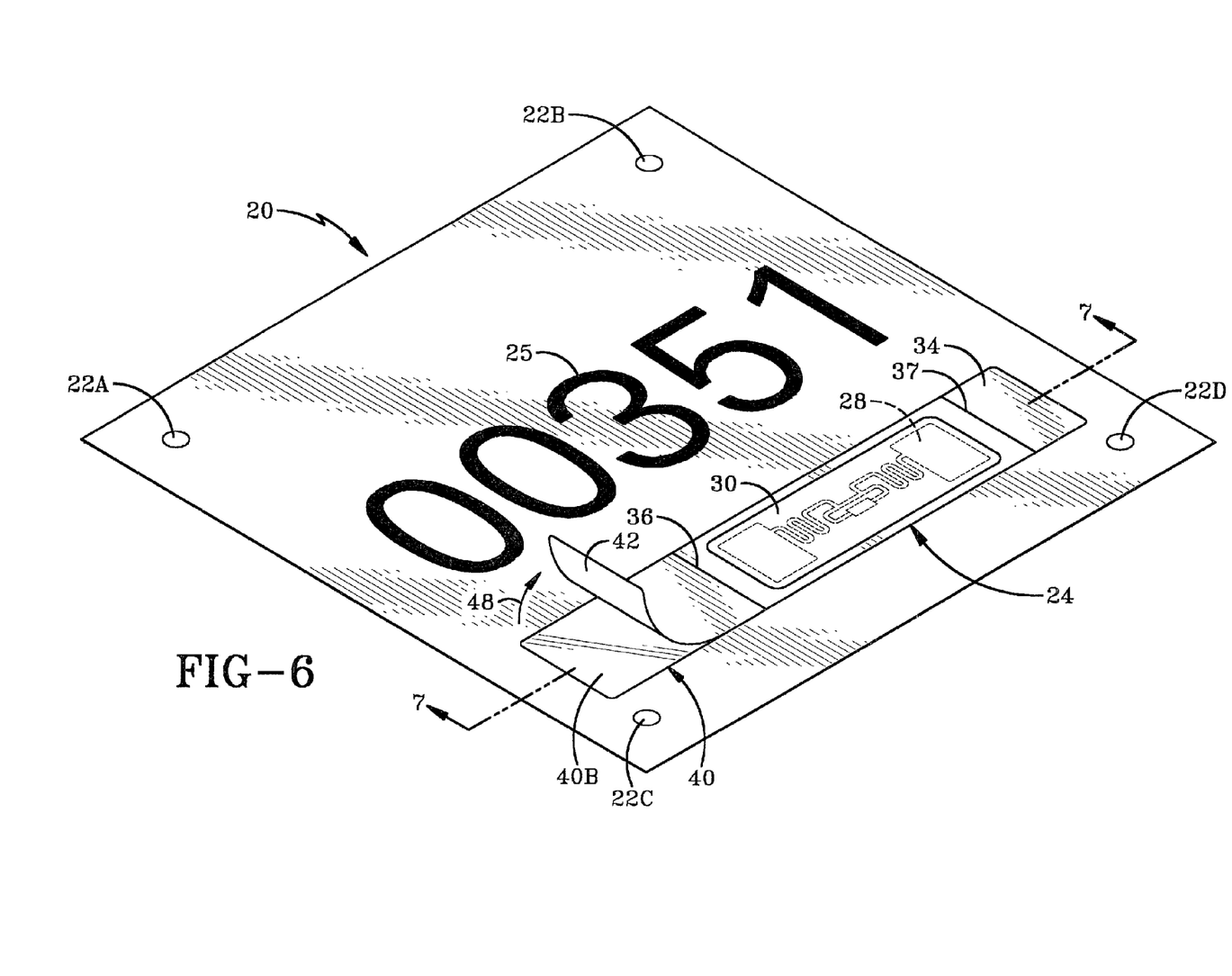
FIG. 6 is a perspective view of a preferred embodiment bib with a printed participant's number and an RFID tag being removed from the bib.
Figure 7:
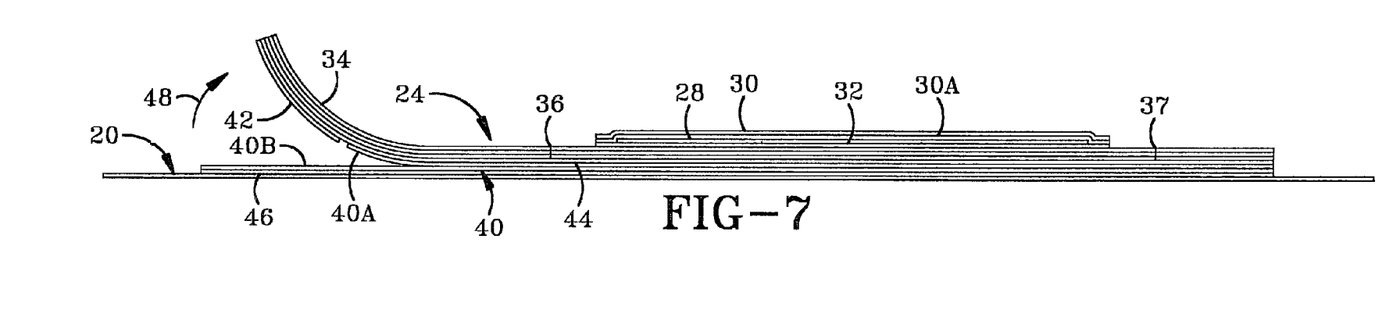
FIG. 7 is a sectional view of the preferred embodiment RFID tag being removed from the bib taken generally along line 7-7 of FIG. 6.

FIG. 6 is a perspective view of a preferred embodiment bib 20 with RFID tag assembly 24 being removed from bottom layer 40B of intermediate layer 40 in an upward and peeling motion in the direction indicated by arrow 48. FIG. 7 is a sectional view taken generally along line 7-7 in FIG. 6 with RFID tag assembly 24 being removed from bottom layer 40B which is in turn permanently secured to bib 20 with adhesive 46.

RFID tag assembly 24 is then applied to bib 20 which may include indicia 25 printed thereon. If the RFID tag assembly is applied to a bib that already includes indicia 25, then the RFID tag assembly will be printed and encoded with the number or data corresponding to indicia 25. If bib 20 does not include indicia 25 at this point, then the combination bib and RFID tag assembly are sent through a process which encodes the RFID tag with a number or data that corresponds to indicia that is printed on the bib during the same process.

Figures 8, 9:
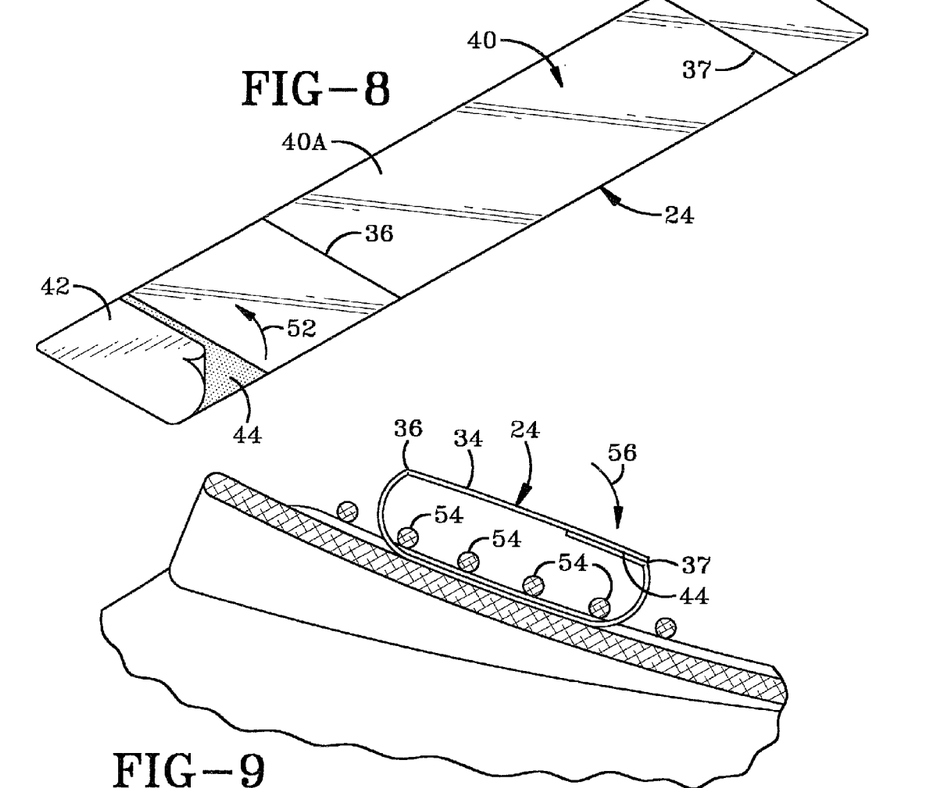
FIG. 8 is a perspective view of the back-side of a preferred embodiment RFID tag removed from the mounting film and the adhesive of the first end being exposed.
FIG. 9 is a sectional view of a preferred embodiment RFID tag inserted under four laces and the adhesive strip of the first end secured to the second end.

Averting to FIG. 8, RFID tag assembly 24 is shown removed from bottom 40B of intermediate layer 40 and turned upside-down. The participant then removes liner 42 in the direction indicated by arrow 52 to expose adhesive 44. Although adhesive 44 has been described as permanent, it is within the spirit and scope of the present invention as claimed to include a semi-permanent adhesive, a releasable adhesive, or a hook and loop connection which allows the RFID tag assembly to remain securely fastened to the participant during use and still be removed.

As can be seen, the applicant envisions that RFID tag assembly 24 may be shipped on attached mounting film 26 as is shown in FIGS. 4 and 5. If the product is shipped not attached to bib 20, then top layer 40A will have to be removed from bottom layer 40B which remains attached to mounting film 26. Alternatively, RFID tag assembly 24 may be shipped applied directly to bib 20 such that mounting film 26 exists only in the factory and is not seen by the race participant.

Figure 10:
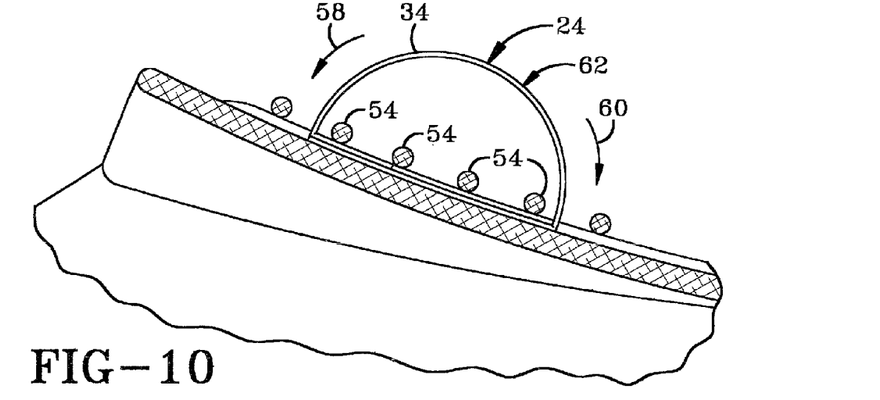
FIG. 10 is a sectional view of a preferred embodiment RFID tag being rotated so that the RFID tag is distal the laces.

FIGS. 9 and 10 illustrate RFID tag assembly 24 being secured to a participant's shoe prior to a race. After liner 42 is removed and adhesive 44 is exposed, the participant inserts RFID tag assembly 24 in an upside-down orientation underneath laces 54 of his/her shoe. The participant then folds RFID tag assembly 24 first along fold line 37 and then along fold line 36 in the direction of arrow 56 to encircle laces 54 and secure the assembly with adhesive 44.

The participant then rotates RFID tag assembly 24 in the direction of arrow 58 or 60 so that the bowed portion 62 of the RFID tag assembly projects away from laces 54. Advantageously, in the preferred embodiment, the offset arrangement of the fold lines ensures that bowed portion 62, which houses the RFID tag, is less likely to be affected by the damp environment created by wet or sweaty shoes since the RFID tag is spaced away from the participant's body and/or shoes. In addition, the RFID tag is able to receive the antenna radio frequency and transmit data more efficiently in the bowed arrangement.

Figure 11:
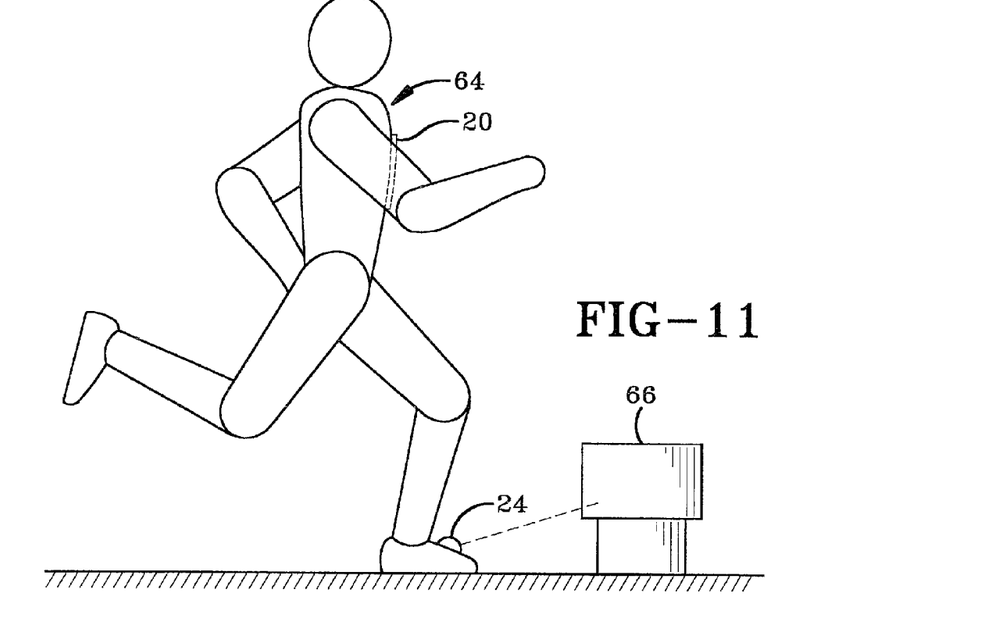
FIG. 11 is a side view of a participant with a present invention RFID tag secured to the participant's shoe and being activated by an antenna; and, FIG. 12 is a side view of a participant with a present invention bib having an RFID tag removably secured thereon and being activated by an antenna.
Figure 12:
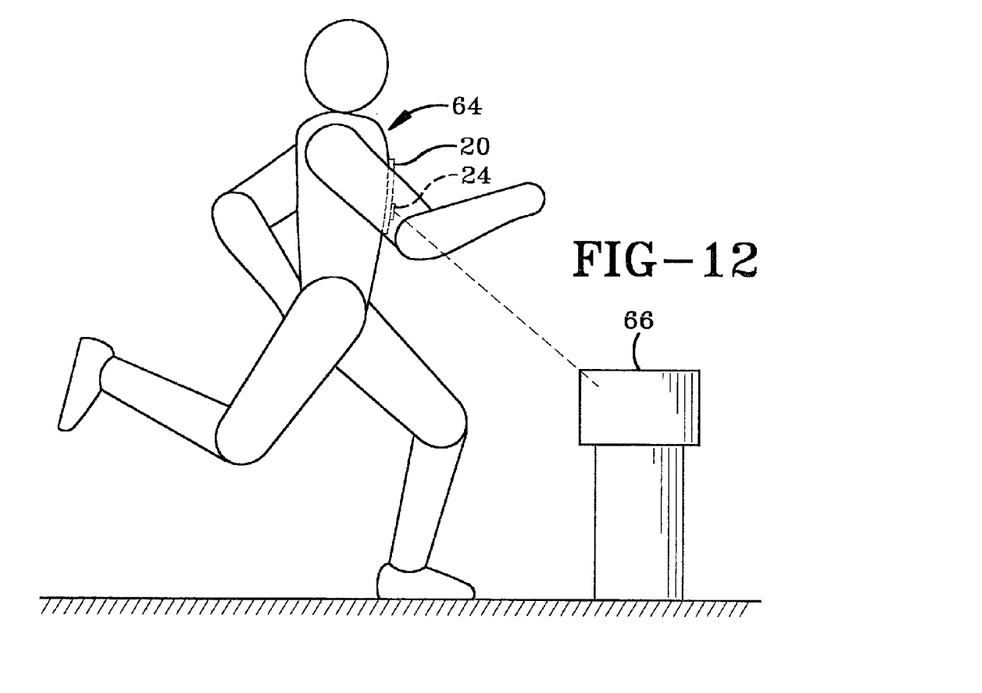

FIGS. 11 and 12 illustrate preferred embodiments of the present invention with participant 64 running past antenna 66. FIG. 11 shows RFID tag assembly 24 secured to the participant's shoe as described infra and antenna 66 emitting a radio frequency which powers RFID tag assembly 24 and transmits the data encoded in the RFID tag back to the antenna.

FIG. 12 shows participant 64 wearing bib 20 with RFID tag assembly 24 secured to the bib. The RFID tag assembly operates in a fashion similar to the preferred embodiment illustrated in FIG. 11, with the exception of antenna 66 location. Since the RFID tag is located on the chest of the participant, antenna 66 must be elevated to ensure that the RFID tag receives the radio frequency emitted by the antenna.

Although the present invention has been described as secured through at least one lace, it is within the spirit and scope of the present invention as claimed to be secured to any suitable portion of a participant, including but not limited to a shoe, bracelet, belt, wrist or ankle.

Having now described the structure and method of manufacturing the RFID tag assembly and the bib, a method of managing a race will be described in detail.

Participant 64 is assigned an identification number which corresponds to indicia 25 and the data encoded on RFID tag 28. First, RFID tag 28 is located between outer layer 30 and inner layer 32. Next, inner layer 32 is secured to synthetic material 34 and the synthetic material is releasably secured to bib 20 which has indicia 25 corresponding to the participant's identification number printed thereon. RFID tag 28 is then encoded with data corresponding to the participant's assigned identification number.

Prior to the race beginning, the participant removes the encoded RFID tag from the bib and encircles at least one lace by securing adhesive 44 to RFID tag assembly 24. The participant then rotates the RFID tag assembly in the direction of arrow 58 or 60 to project bowed portion 62 away from laces 54. Further, radio frequency emitting antennas 66 are disposed at multiple locations throughout the course, including but not limited to, the start line and the finish line.

After the race begins, the antennas are activated and as participant 64 passes antenna 66, the RFID tag 28 is powered by antenna 66 and participant's identification number encoded in the tag is transmitted back to the antenna and records the participant's start or stop time, as applicable. Further, a plurality of antennas may be disposed throughout the course to provide participant's with various sectional completion times.

Further, RFID tag 28 may include health information such as medications the participant is currently taking, allergies, blood type, and medical insurance carrier. If a participant were to be injured or pass out, a race coordinator or medic would be able to activate the RFID tag and obtain all of the necessary information to treat the participant without losing valuable time. However, in the preferred embodiment, RFID tag 28 would include a five-digit number that is related to or exactly corresponds to indicia printed on bib 20. This number would correspond to an electronic file in a data base to allow race managers to access a variety of information available about the race participant which may include, but is not limited to, medical information, necessary allergies and the like, as well as citizenship, telephone number, next of kin and address. However, a variety of information could be provided without departing from the spirit of the present invention.

Accordingly, the RFID tag assembly is an effective, safe, inexpensive, and efficient device that achieves all the enumerated objectives of the invention, provides for eliminating difficulties encountered with prior art devices, systems, and methods, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the RFID tag is constructed and used, the characteristics of the construction, and the advantageous new and useful results obtained; the new and useful structures, devices, elements, arrangement, parts, combinations, and methods are set forth in the appended claims.

The invention claimed is:

1. A method of manufacturing a race tag assembly comprising the steps of:
   providing an inner layer of a waterproof or water-resistant material;
   providing an outer layer of a waterproof or water-resistant material
   positioning a tag between the inner and outer layers, where the tag is adapted to be programmed with information and is adapted to transmit a signal to a remote receiver;
   sealing the inner and outer layers together around their perimeters such that the tag is embedded between the inner and outer layers and the waterproof or water-resistant material covers the entire tag; and
   securing the embedded tag to a racing bib.

2. The method of manufacturing the race tag assembly as defined in claim 1, further comprising the step of:
   providing a first adhesive layer between the tag and an interior surface of one of the inner and outer layers; and adhering the tag to the interior surface of the one of the inner and outer layers by way of the first adhesive layer.

3. The method of manufacturing the race tag assembly as defined in claim 2, further comprising the step of:
applying the first adhesive layer along substantially the entire length of the tag.

4. The method of manufacturing the race tag assembly as defined in claim 1, wherein the step of securing the embedded tag to the racing bib further comprises the steps of:
securing a mounting film to an exterior surface of the racing bib; and
securing the embedded tag to the mounting film.

5. The method of manufacturing the race tag assembly as defined in claim 4, wherein the step of securing the embedded tag to the mounting film includes:
securing the embedded tag to the mounting film such that the inner layer of the embedded tag is selectively removably engaged with the mounting film and is selectively separable therefrom.

6. The method of manufacturing the race tag assembly as defined in claim 5, further comprising the steps of:
providing a mounting assembly comprised of an upper layer, a lower layer, and a second adhesive layer disposed between the upper and lower layers;
securing the upper layer of the mounting assembly to the inner layer of the embedded tag; and
securing the lower layer of the mounting assembly to the exterior surface of the racing bib.

7. The method of manufacturing the race tag assembly as defined in claim 6, further comprising:
positioning an intermediate layer between the lower layer and the second adhesive layer.

8. The method of manufacturing the race tag assembly as defined in claim 7, further comprising the step of:
permanently securing the intermediate layer to the upper layer by way of the second adhesive layer.

9. The method of manufacturing the race tag assembly as defined in claim 8, further comprising the steps of:
substantially aligning a first end of the upper layer with a first end of the lower layer;
substantially aligning a second end of the upper layer with a second end of the lower layer;
substantially aligning a second end of the intermediate layer with the second ends of both of the upper and lower layers; and
positioning a first end of the intermediate layer a distance inwardly away from the aligned first ends of the upper and lower layers.

10. The method of manufacturing of the race tag assembly as defined in claim 9, further comprising the steps of:
positioning a backer strip over a section of the second adhesive layer disposed between the aligned first ends of the upper and lower layers and the first end of the intermediate layer.

11. The method of manufacturing of the race tag assembly as defined in claim 10, further comprising the step of:
releasably securing the backer strip to the upper layer.

12. The method of manufacturing of the race tag assembly as defined in claim 6, further comprising the steps of:
applying a third adhesive layer between the lower layer of the mounting assembly and the exterior surface of the mounting film; such that the third adhesive layer penetrates the lower layer and secures the lower layer to the mounting film.

13. The method of manufacturing of the race tag assembly as defined in claim 12, wherein the step of applying the third adhesive layer includes:
selecting a third adhesive layer which will releasably secure the lower layer to the mounting film and releasably secure the lower layer to the intermediate layer.

14. The method of manufacturing of the race tag assembly as defined in claim 9, further comprising the step of:
forming a first fold in the mounting assembly a distance inwardly from the first end of the intermediate layer and toward the second end of the upper layer; and wherein the first fold is disposed substantially parallel to the first and second ends of the upper layer.

15. The method of manufacturing of the race tag assembly as defined in claim 14, further comprising the step of:
forming a second fold of the mounting assembly a distance inwardly from the second end of the upper layer and spaced a distance apart from the first fold; and wherein the second fold is substantially parallel to the first fold.

16. The method of manufacturing of the race tag assembly as defined in claim 15, further comprising the step of:
applying the second adhesive layer to the intermediate and upper layers between the first fold and the second fold.

* * * * *